United States Patent [19]

Sinjou et al.

[11] Patent Number: 4,603,413
[45] Date of Patent: Jul. 29, 1986

[54] DIGITAL SUM VALUE CORRECTIVE SCRAMBLING IN THE COMPACT DIGITAL DISC SYSTEM

[75] Inventors: Johannes P. Sinjou; Herman G. Lakerveld, both of Eindhoven, Netherlands

[73] Assignee: U.S. Philips Corporation, New York, N.Y.

[21] Appl. No.: 614,934

[22] Filed: May 29, 1984

[30] Foreign Application Priority Data

Nov. 10, 1983 [NL] Netherlands ............. 8303859

[51] Int. Cl.$^4$ ............................................. G11B 7/013
[52] U.S. Cl. ............................................. 369/59; 371/4
[58] Field of Search ............ 369/48, 59; 360/32, 360/40, 39; 371/39, 40, 4, 56

[56] References Cited

U.S. PATENT DOCUMENTS

| | | | |
|---|---|---|---|
| Re. 31,311 | 7/1983 | Miller | 369/59 |
| 4,150,404 | 4/1979 | Tercic et al. | 360/39 |
| 4,234,898 | 11/1980 | Nakagawa et al. | 360/40 |
| 4,282,551 | 8/1981 | Kanazawa et al. | 360/32 |
| 4,346,353 | 8/1982 | Scholz | 369/59 |
| 4,410,877 | 10/1983 | Carasso et al. | 360/40 |
| 4,414,659 | 11/1983 | Beckers | 369/59 |
| 4,466,089 | 8/1984 | Wachi | 360/32 |

Primary Examiner—Donald McElheny, Jr.
Attorney, Agent, or Firm—Thomas A. Briody; William J. Streeter; Leroy Eason

[57] ABSTRACT

A method and apparatus for recording and reading information in the form of a track of pit and land areas on an optical digital disc record carrier. The information is first encoded from symbol blocks of data bits into symbol blocks of channel bits to which are added merging bits selected so as to minimize the d.c. unbalance or digital sum value of the channel bits. Those parts of the stream of channel bits for which the d.c. unbalance does not meet predetermined criteria are subjected to selective scrambling to correct such unbalance prior to recording. During read-out the correctively scrambled parts of the recovered symbol blocks of data bits are descrambled in an inverse manner. Information identifying such parts is recorded with the channel bits. The invention also relates to a record carrier on which information has been so recorded.

23 Claims, 10 Drawing Figures

DIGITAL SUM VALUE CORRECTIVE SCRAMBLING IN THE COMPACT DIGITAL DISC SYSTEM

BACKGROUND OF THE INVENTION

1. Field of the Invention

The invention relates to a method and apparatus for recording and/or reading audio or other information in the form of a track of optically detectable pits and land areas in a record carrier, the information being in the form of sequences of binary data bits representing the changes in successive quantized samples of the information. The stream of data bits is divided into consecutive frames each of which comprises consecutive symbol blocks of m data bits, each data symbol block being encoded for recording as a symbol block of $n_1+n_2$ channel bits, $(n_1+n_2)>m$, where $n_1$ is the number of symbol information channel bits and $n_2$ is a number of channel "merging" bits which are added to assure that a change in binary value persists long enough to result in at least a minimum pit or land run length. The invention also relates to a record carrier having information recorded thereon in accordance with the aforesaid method.

2. Description of the Related Art

Digital recording of information on an optical disc record carrier by means of a laser beam is described in the publication "Philips Technical Review", Vol. 40, 1982, No. 6, particularly the articles "Compact Disc: System Aspects and Modulation" by J. P. J. Heemskerk and K. A. Schouhamer Immink at pages 157–164; and the article "Compact Disc Digital Audio System" by Messrs. Carasso, Peek and Sinjou at pages 151–155. For a more complete understanding of digital disc recording, reference may be made to that publication. In that method, the analog audio signal is sampled at a rate of 44.1 kH$_z$ and the samples are quantized and digitally encoded into 32 bits per sample. The 32 bits corresponding to each sample are grouped into "symbol" blocks of 8 bits each, and these are encoded by an "Eight to Fourteen" (EFM) modulator into new symbol blocks of 14 channel bits such that any "0" or "1" bit occurs at least twice in succession. This assures that the run length of each pit and land produced in the record carrier by the channel bits will extend for at least 3 channel bits, which substantially increases the recorded information capacity of the disc record carrier. In order to maintain at least the minimum run length when the channel bits of successive symbols are merged into a single channel bit stream, at least two additional "merging bits" are added to the channel bits for each symbol. As a result of this, however, the digital sum value (DSV) of the channel bits of successive symbols may become appreciable, resulting in production of a significant d.c. or average value of the channel bit signals. This is undersirable because, as pointed out in the first of the above-identified articles, changes in average signal intensity due to soiling of the disc can result in read-out errors if such changes reduce the signal below the read-out decision level. These low-frequency components of the signal can be eliminated by filtering, but this is feasible only if the information signal itself contains no low frequency components. Accordingly, a third merging bit is added to the channel bits for each symbol and which is selected so as to minimize the DSV of the channel bits of successive symbols.

Generally, as pointed out in the second of the above-identified articles, the symbol blocks of data bits are interleaved and provided with additional error correcting parity bits prior to being translated into channel bits.

It has been found that under certain conditions, despite the addition of merging bits to minimize the d.c. unbalance (or DSV) of the channel bits, the DSV may become sufficiently significant to adversely affect readout of the channel bits.

SUMMARY OF THE INVENTION

It is an object of the invention to provide a method which more effectively provides correct read-out of the channel bits recorded in the record carrier. To this end, during recording of those parts of the data bit stream for which the resulting d.c. unbalance of the channel bit stream would not comply with specific predetermined criteria, the symbol blocks of data bits are subjected to corrective DSV modulation or scrambling whereby those parts of the data bit stream are brought into compliance with such criteria. During the reading operation the channel bits are subjected to a selective DSV demodulation or descrambling, so that the relevant parts of the data bit stream are descrambled in an inverse manner.

The invention is based on recognition of the fact that disturbances of the read process are caused by a specific behavior of the d.c. unbalance of the recorded channel bit signal. In particular, this behavior of the d.c. unbalance may occur in the case of prolonged recurrence of a fixed pattern of channel bits on the record carrier. In the case of an audio signal such a pattern is highly unlikely. However, such patterns are more likely to occur when data for processing by a computer system is recorded. Such a pattern may involve an oscillating variation of the d.c. unbalance, causing it to increase within one period of the recorded information (for example, a frame) and to decrease within the next information period. If the frequency of such oscillation is comparatively high, during the read operation the decision level for detection of the channel bit signals may be rendered inaccurate. As a result, read-out of the information will be disturbed to such an extent that even the error-correction measures cannot prevent errors. Moreover, the tracking system for controlling the read laser which reads the channel bits may become incapable of keeping the laser beam accurately positioned on the track.

By subjecting only those parts of the data bit stream which ultimately give rise to undesired d.c. unbalance to corrective DSV scrambling, without subjecting the remainder of the data bit stream to such scrambling, the likelihood that the d.c. unbalance with not comply with predetermined criteria can be minimized. The corrective scrambling modifies the bit positions in the relevant portions of the stream of symbol blocks of data bits in a specified arbitrary manner which varies with time, thereby deriving a stream of scrambled data bit symbol blocks having a d.c. unbalance which does comply with the predetermined criteria. Of course, during read-out the data bit stream must be descrambled in a manner which is the inverse of the aforesaid time-variable scrambling during recording.

Before the symbol blocks of data bits are encoded into symbol blocks of channel bits they are first cross-interleaved according to a predetermined pattern to form new symbol blocks of data bits. This is done for purposes of error control and correction, as described in the article "Error Correction and Concealment in the Compact Disc System" by Messrs. Hoeve, Timmermans and Vries at pages, 166–173 of the above-identified Philips Technical Review publication. Scrambling for correcting the d.c. unbalance may, therefore, be effected either before or after interleaving of the symbol blocks of data bits. The first possibility has the advantage that the corrective DSV scrambling is compatible with established international standards for the Compact Disc system. However, since the channel bits which ultimately cause the d.c. unbalance to depart from the specified criteria originate from entirely different locations in the data symbol bit stream owing to subsequent cross-interleaving, a comparatively greater part of the bit stream must be scrambled to correct for such unbalance. If the scrambling operating is performed after cross-interleaving, which is the second possibility, a comparatively smaller part of the bit stream must be subjected to corrective scrambling. This, however, would require a modification of the established standards for the Compact Disc system.

According to the invention, the method of recording information in the form of a track on an optical disc record carrier is characterized in that during encoding of the symbol blocks of data bits into symbol blocks of channel bits a determination is made of which parts of the data bit stream give rise to noncompliance of the channel bit stream with the DSV or d.c. unbalance criteria. During recording, those parts of the data bit stream are replaced with data bits which have been scrambled to prevent such non-compliance. Thus, the data bits are encoded twice to form the channel bits.

How large a part of the data bit stream must be subjected to DSV corrective scrambling depends, at least in part, on the format in which information is recorded on the record carrier. In the standard Compact Disc system the information is recorded in contiguous frame groups, each frame group comprising 98 contiguous frames, each frame comprising 34 symbol blocks of 17 bits. Such symbol blocks include one block of control bits, 24 blocks of data bits, eight blocks of parity bits and one block of 27 synchronizing bits. The parts of the data bit stream to be scrambled may each have a length of at least one frame. If the scrambling process is applied before cross-interleaving (the first of the above-mentioned possibilities), such parts of the data stream will have to be substantially longer than if scrambling is applied after cross-interleaving. In that case the parts of the data stream to be scrambled may extend over one or more subcode frame groups.

Information identifying whether or not a frame has been subjected to DSV corrective scrambling could be contained in the control symbol block of the frame. If the scrambled parts of the data stream have a length of at least one subcode frame group, information so indicating could be contained in the subcode of that frame group. However, in either of such cases the information would not be protected against error during read-out, so that a part of the data bit stream which has been scrambled for DSV correction may not be so identified and, during read-out of such part it will not be descrambled. This means that a part of the data stream extending the length of a frame, or possibly even an entire subcode frame group, would be read-out incorrectly. The identifying information should, therefore, be contained in one of the symbol blocks of data bits in one of the early frames in the subcode frame group. Since this precedes the error correcting cross-interleaving operation, the identifying information will thereby be protected against erroneous read-out. In such a method, during recording the data stream is processed in the sequence: selective DSV scrambling, cross-interleaving, and EFM encoding of the symbol blocks of data bits into symbol blocks of channel bits. The recorded information must then be processed in the reverse sequence during read-out: EFM decoding of the corresponding symbol blocks of channel bits to recover the symbol blocks of data bits, cross-deinterleaving, and selective DSV descrambling. If during recording the corrective DSV scrambling is effected after error correcting cross-interleaving, the recording sequence is: cross-interleaving, selective DSV scrambling, and EFM encoding of the symbol blocks of data bits into symbol blocks of channel bits. The sequence during read-out will then be: EFM decoding to recover the symbol blocks of data bits, DSV descrambling, and cross-deinterleaving.

Apparatus in accordance with the invention for recording information in the form of a track of optically detectable areas in a record carrier is adapted to carry out the aforesaid method of DSV correction. Such apparatus comprises:

an input terminal for receiving consecutive symbol blocks of data bits corresponding to the information to be recorded; an encoder or EFM modulator coupled to the input terminal for encoding the symbol blocks of data bits into consecutive symbol blocks of channel bits, detector means coupled to the encoder for supplying a control signal when the DSV of parts of the stream of channel bits do not comply with predetermined criteria, and circuit means responsive to such control signal for selectively scrambling those parts of the stream of channel bits having a DSV which does not comply with the predetermined criteria.

The circuit means for selectively scrambling parts of the channel bit stream may be either self-synchronizing or non-self-synchronizinq. Such circuits are well known in the art, self-synchronizing scramblers being described, for example, in the article appearing at pages 449–487 of the Bell System Technical Journal, February 1967. Non-self-synchronizing modulators are preferable because error-propagation cannot occur.

The invention also provides apparatus for reading information from a track in an optical record carrier which has been subjected to selective DSV corrective scrambling. Such apparatus comprises:

means for reading the recorded symbol blocks of channel bits from the track, a decoder or EFM demodulator coupled to the read means for decoding the consecutive symbol blocks of channel bits into consecutive symbol blocks of data bits corresponding thereto, detector means coupled to the read means for identifying those parts of the channel bit stream corresponding to parts of the data bit stream which had been selectively scrambled for DSV correction prior to recording in the record carrier, and for supplying a control signal upon such identification, and circuit means connected to the detector means and responsive to the control signal produced thereby to selectively de-scramble the scrambled parts of the data bit stream. The de-scrambler may be either self-synchronizing or non-self-synchronizing, depending on whether the corrective DSV scrambling during recording was effected by a self-synchronizing or a non-self-synchronizing modulator.

If corrective DSV scrambling during recording was effected before cross-interleaving, the decoder precedes the DSV correction de-scrambler and decodes the symbol blocks of channel bits into consecutive symbol blocks of data bits prior to de-interleaving them. If corrective DSV scrambling during recording was effected after cross-interleaving, the decoder for de-interleaving the cross-interleaved symbol blocks of data bits is arranged between the DSV correction de-scrambler and the output terminal of the apparatus.

BRIEF DESCRIPTION OF THE DRAWINGS

The invention will now be described in more detail with reference to the accompanying drawings, in which the same reference numerals in different figures refer to the same elements. In the drawings.

DESCRIPTION OF THE PREFERRED EMBODIMENTS

Figure 1:
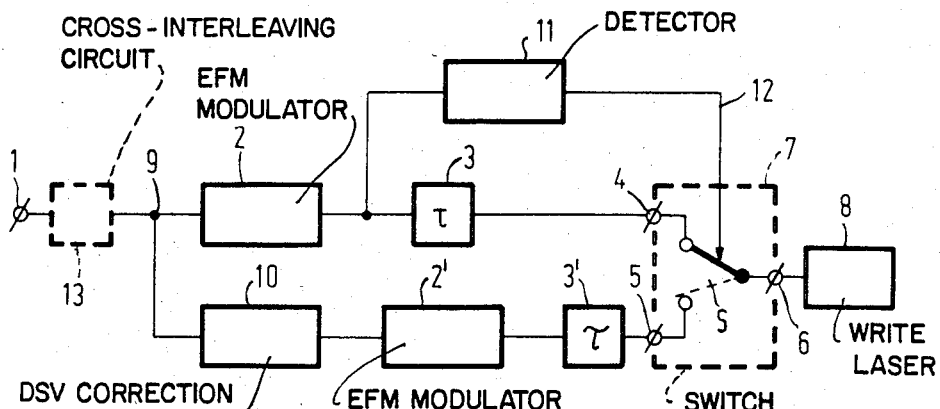
FIG. 1 shows a circuit drawing of a first embodiment of apparatus in accordance with the invention for recording information in an optical digital disc record carrier.

FIG. 1 shows a first embodiment of apparatus in accordance with the invention for recording information in an optical digital disc record carrier. The apparatus comprises an input terminal 1 for receiving the information in the form of successive and contiguous symbol blocks of binary data bits. Terminal 1 is connected via a connection point 9 to the input of an encoder 2 which encodes the symbol blocks of data bits into consecutive symbol blocks of channel bits. As described in the above-identified Philips. Technical Review publication, in the standard Compact Disc system the encoder 2 is an eight-to-fourteen (EFM) modulator and will not be considered herein. The output of EFM modulator 2 is coupled to a first input terminal 4 of switching means 7 by a delay line 3 which provides a delay time $\tau$. The output terminal 6 of switching means 7 is coupled to write laser means 8 which produces pits and lands in an optical disc record carrier corresponding to the channel bits. Connection point 9 is also coupled to the input of a DSV correction scrambler circuit 10 which selectively scrambles the symbol blocks of data bits applied to input terminal 1. The output of DSV correction scrambler 10 is connected to a second encoder 2' which may be an EFM modulator identical with EFM modulator 2, the output of EFM modulator 2' being connected by a second delay line 3', which also provides a delay $\tau$, to a second input terminal 5 of switching means 7. The output of EFM modulator 2 is also coupled to detector circuit means 11, which detects whether parts of the channel bit stream are not in conformity with specific predetermined criteria and when that is detected supplies a control signal to switching means 7 via a line 12. Switching means 7 normally connects its input terminal 4 to its output terminal 6. When a control signal is present on line 12, it operates on completion of the then existing channel bit symbol block interval to switch its input terminal 5 to its output terminal 6. It then remains in that condition, switching back to input terminal 4 when the channel bit symbol block appearing at that terminal matches the channel bit symbol block during which the control signal from detector circuit means 11 terminated.

A circuit 13 for cross-interleaving the symbol blocks of data bits in time may be arranged in the connection between input terminal 1 and connection point 9. In FIG. 1 the corrective DSV scrambling for correction of d.c. unbalance of the data bit stream is effected after cross-interleaving (the cross-interleaving may be effected with Reed-Solomon codes as described in the article "Error Correction and Concealment in the Compact Disc System" by Messrs. Hoeve, Timmermans and Bries at pages 166–172 of the above-identified Philips Technical Review publication). As mentioned above, this departs from the international standard for the Compact Disc system. Another possibility is to omit cross-interleaving circuit 13 and to effect the cross-interleaving in EFM modulators 2 and 2' after they encode symbol blocks of data bits into corresponding symbol blocks of channel bits. In that case the corrective DSV scrambling is effected prior to cross-interleaving.

Figure 3:
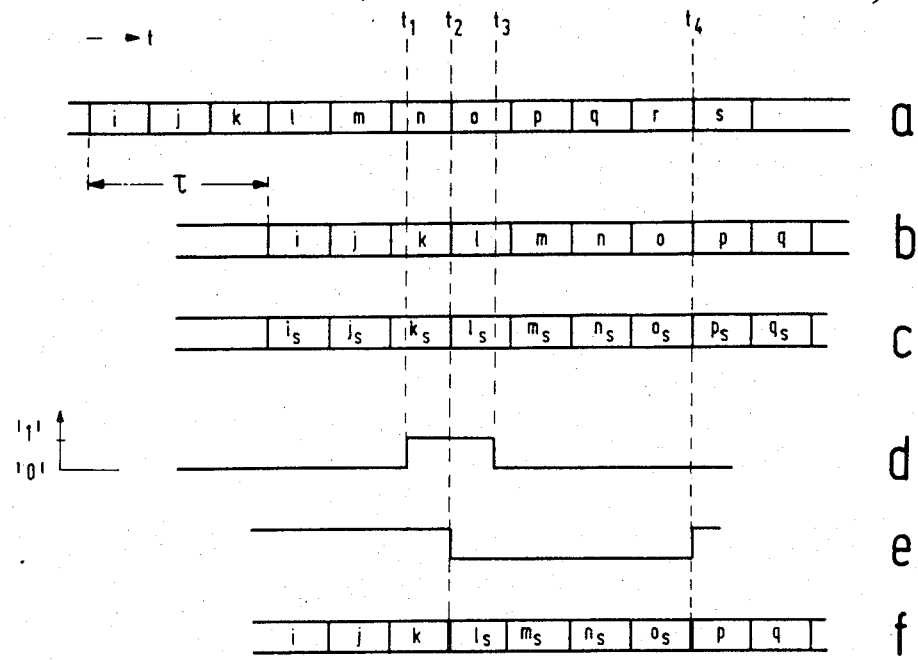
FIGS. 3a–f, 4a–d and 5a–c illustrate how parts of the stream of symbol blocks of data bits to be recorded in an optical digital disc record carrier may be scrambled so that the data sum value (DSV) of such parts remains within acceptable criteria.

The operation of the apparatus in FIG. 1 will be described with reference to the time diagrams in FIG. 3. FIG. 3a represents the stream of symbol blocks of channel bits as a function of time, as it appears at the output of EFM modulator 2. FIG. 3b shows the channel bit stream after it has been delayed by a time interval $\tau$ and which is applied to input terminal 4 of switching means 7. FIG. 3c shows the DSV correctively scrambled channel bit stream after it has also been delayed by the time interval $\tau$ and which is applied to input terminal 5 of switching means 7. The successive channel bits are grouped into consecutive units of a selected size, each unit bearing the reference letters i,j, . . . r,s, the scrambled unit of channel bits being denoted by an additional subscript 's'. The delay $\tau$ in FIG. 3 is three of such units. The units may have a length of one frame (as described in the above-identified Philips Technical Review publication at page 163), or one subcode frame group (comprising 98 frames). FIG. 3d shows the control signal produced by detector 11 when the d.c. unbalance or DSV of the channel bit stream does not comply with predetermined criteria, this DSV control signal being supplied on line 12 in FIG. 1 to switching means 7. If the signal is high (logic '1') the DSV value does not comply with such criteria, and if the signal is low (logic '0') it does so comply. It is apparent from FIG. 3d that during the time interval $t_1$ to $t_3$ the DSV value is not in compliance with the predetermined criteria. The waveform in FIG. 3e indicates the response of switching means 7 to the DSV control signal. So long as the control signal remains "low" switching means 7 will be in the position shown in FIG. 1, with its input terminal 4 being connected to its output terminal 6. When the control signal becomes "high", switching means 7 is enabled to switch to the dotted line position shown in FIG. 1, with its input terminal 5 connected to output terminal 6. FIG. 3f shows how the channel bit stream applied to write laser means 8 is thereby switched from the channel bit stream in FIG. 3b produced by EFM modulator 2 to the DSV channel bit scrambled stream in FIG. 3c produced by DSV correction scrambler 10 and EFM modulator 2'.

The operation is as follows. At time $t_1$ the DSV value is found by detector 11 not to comply with predetermined criteria. In FIG. 3a this occurs during occurrence of unit n of the channel bit stream. For units which are delayed by time $\tau$ (FIGS. 3b and 3c), the first such unit which is completed after time $t_1$ is the unit k, which ends at time $t_2$. At that instant, which also marks the beginning of the succeeding unit 1, switching means 7 switches over as shown in FIG. 3e. Its input terminal 5 is then connected to its output terminal 6 and the channel bit stream in FIG. 3c is conducted thereto. At time $t_3$, during occurrence of undelayed channel bit unit o (see FIG. 3a), detector 11 determines that the DSV value is again in compliance with the predetermined criteria and returns the DSV control signal in FIG. 3d to its "low" level. This enables switching means 7 to again switch back to its normal connection of output terminal 6 to input terminal 4, but such switching does not occur until completion of the channel stream unit o at that terminal, which is the unit during which the control signal was terminated. As a result, the unscrambled channel bit stream units up to and including the unit k is recorded on the record carrier until time $t_2$, during the time interval $t_2-t_4$ the scrambled channel bit stream units (units $1_s$ up to and including $o_s$) are recorded, and beginning at time $t_4$ the unscrambled channel bit stream units, starting with unit p, are recorded.

The choice of the value of the delay time $\tau$ depends on how much effect the channel bits in units preceding any $n^{th}$ unit has in increasing the value of the DSV by the time of occurrence of the $n^{th}$ unit. If this effect is not too great, that is, if the influence of the channel bits at a specific instant on the DSV value at a later instant is very small, a delay $\tau$ equal to one unit length of the channel bit stream would be sufficient. In FIG. 3, in that case only the channel bit unit n and o in which the DSV value does not comply with the predetermined criteria would then be replaced by the DSV corrected scrambled versions thereof, units $n_s$ and $o_s$.

Figure 4:
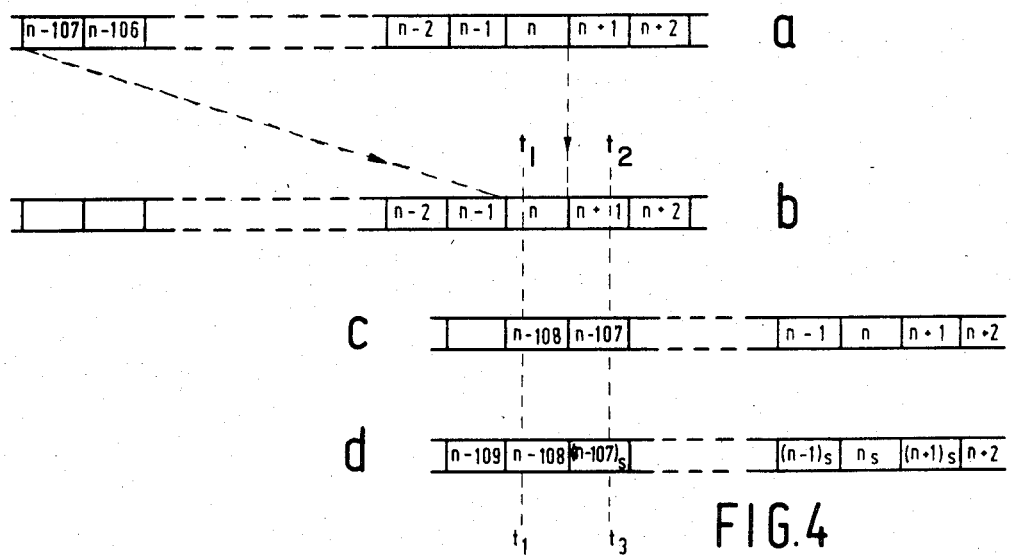

If, as shown in FIG. 1, cross-interleaving of the symbol blocks of data bits is effected prior to the DSV corrective scrambling, the choice of $\tau$ is not affected by the interleaving. However, if DSV scrambling is performed prior to cross-interleaving, $\tau$ must be chosen in conformity with the distribution in time of the cross-interleaved original symbol blocks of data bits. This is explained with reference to FIG. 4. FIG. 4a shows the data bit stream as applied to the input of EFM modulator 2 and FIG. 4b shows the data bit stream as it appears at the output of EFM modulator 2. In both cases the data bit stream is shown subdivided into units which of one frame length. If each frame has the standard structure, such as shown at page 163 of the above-referenced Philips Technical Review publication, the information in frame n of FIG. 4b will originate from information contained in units (n−107) to n in the information stream of FIG. 4a as a result of cross-interleaving. Consequently, parts of units (n−10) to n in FIG. 4a have been shifted in time and appear in frame n of FIG. 4b. If at time $t_1$, i.e. for the information in unit n of FIG. 4b, it is found that the DSV value is no longer within the predetermined criteria, that will be because of information present in units (n−107) to n in FIG. 4a. The corrective DSV scrambling should therefore be applied beginning at least with unit (n−107) in FIG. 4a. For this purpose, FIG. 4c shows the data bit stream of FIG. 4b delayed by 108 units when it is applied to input terminal 4 of switching means 7. At the same time, in parallel therewith the delayed DSV scrambled data bit stream (not shown) from EFM modulator 2' will be applied to terminal 5. FIG. 4d shows the resulting data bit stream which will be produced at output terminal 6 of switching means 7. It is assumed that the DSV value departs from the predetermined criteria from time $t_1$ to time $t_2$, which occurs during units n and (n+1) in FIG. 4b. In FIG. 4d it can be seen that units (n−107) to (n+1) have been replaced by their DSV scrambled versions $(n-107)_s$ to $(n+1)_s$.

Figure 5:
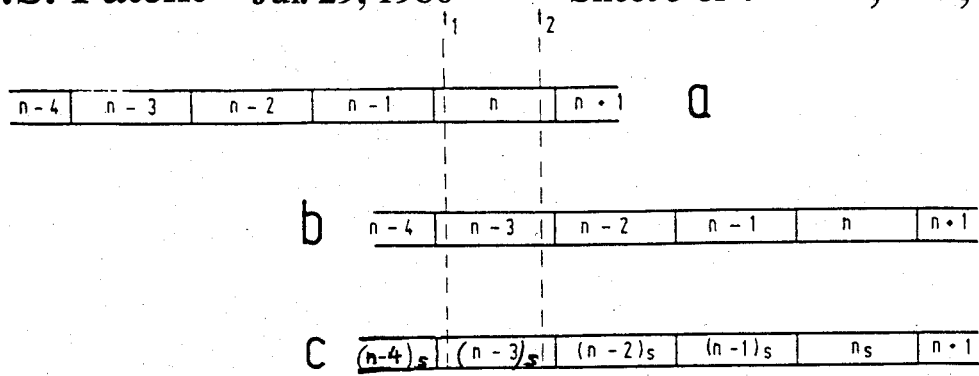

If the smallest units to be correctively DSV scrambled are the size of one sub-code frame group, which group comprises 98 frames, the delay time $\tau$ should have a minimum length of three sub-code frame groups. This can be understood by reference to FIG. 5. As a result of cross-interleaving, an incorrect DSV value in one of the first ten frames of the interleaved sub-code frame group n (see FIG. 5a) at time $t_1$ is caused by a frame which prior to cross-interleaving was situated 108 frames earlier in the data bit stream, i.e. was in the sub-code frame group (n−2). This means that corrective DSV scrambling must be applied from the beginning of sub-code frame group (n−2). FIG. 5b shows the data bit stream which has been delayed by three sub-code frame groups and which is applied to input terminal 4 of switching means 7. At the same time, in parallel therewith correctively DSV scrambled data stream units (not shown) are applied to input terminal 5 of switching means 7. If it is assumed that from time $t_1$ to $t_2$, i.e. only within the sub-code frame code n, the DSV value is unacceptable, the sub-code frame groups (n−2), (n−1) and n will be replaced by their correctively DSV scrambled versions $(n-2)_s$, $(n-1)_s$ and $n_s$. This is shown in FIG. 5c, which represents the channel bit stream at output terminal 6 of switching means 7.

Figure 6:
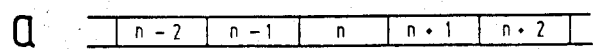
FIG. 6 represents one kind of variation of the DSV, or d.c. unbalance, of the stream of symbol blocks of data bits.
Figure 6:
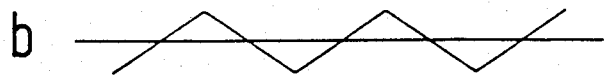

The DSV may be measured against several criteria in order to ascertain whether correction is required. The merging bits which are added when the symbol blocks of data bits are encoded into symbol blocks of channel bits are selected so as to minimize the DSV, preferably making it zero. A criterion may therefore be that if the DSV exceeds a threshold value at any instant corrective scrambling will be initiated at that instant. However, besides the problem which may be caused by an excessive value of the DSV, a further problem may result if it oscillates about its zero level in synchronism with the frame frequency. This is illustrated in FIG. 6, in which FIG. 6a shows a number of consecutive frames (n−2) to (n+2) of symbol blocks of channel bits which appear at the output of EFM modulator 2 in FIG. 1. FIG. 6b shows a possible behavior of the DSV during such frames. As indicated, it increases within one frame (n−2) and decreases within the next frame (n−1). This continues for every consecutive set of two frames. It results in a tone of approximately 3.5 kHz in the channel bit stream, which is obviously undesirable. Accordingly, another criterion for DSV correction may be to filter the energy content of the DSV signal at about 3.5 kHz and to initiate corrective DSV corrective scrambling if this energy content exceeds a predetermined value.

Figure 7:
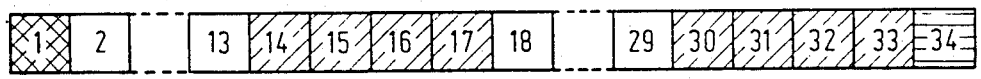
FIG. 7 shows the frame structure of the channel bit stream.
Figure 8:
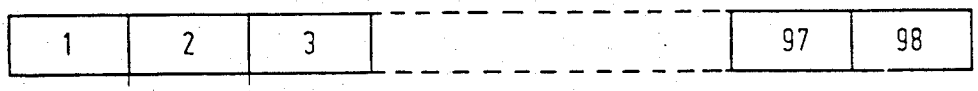
FIG. 8a and b shows the subcode frame group structure of the channel bit stream.
Figure 8:
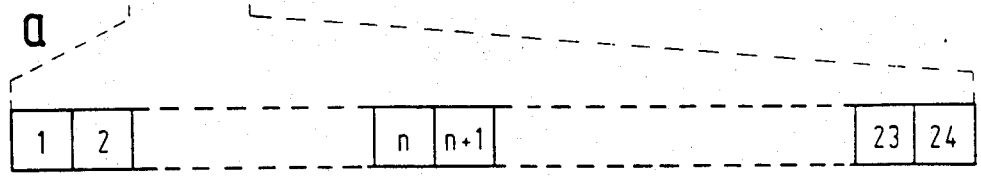

During recording of the channel bit stream, information must be included to identify parts thereof which have been DSV correctively scrambled. This is necessary so that during read-out of the channel bits from the record carrier such correctively scrambled parts can be descrambled in an inverse manner. If such information is to be included in each frame, such as when the smallest unit of the channel bit stream to be correctively scrambled is a frame, one possibility is to include it in the control symbol block of each frame. FIG. 7 shows the structure of a frame of symbol blocks of channel bits, comprising 34 such symbols. The first symbol block, number 1, is the control symbol block in which the information whether the frame has been DSV scrambled can be included. The control symbol block is followed by twelve symbol blocks of information numbered 2 through 13, four parity symbol blocks numbered 14 through 17, twelve further symbol blocks of information numbered 18 through 29, another four parity symbol blocks numbered 30 through 33, and finally one synchronization symbol block numbered 34. Since the control symbol block is added to the information symbol blocks after cross-interleaving, it is not protected against erroneous read-out. Therefore, a DSV scrambled frame may not be recognized as such and may not be descrambled during reading. FIG. 8 shows how this problem can be avoided.

FIG. 8a shows a sub-code frame group comprising 98 frames of which the first two (headers) contain information relating to the sub-code frame group. FIG. 8b shows the second of such header frames in more detail. All the other frames have a similar structure, namely 24 symbol blocks of 8 data bits each. The information whether a sub-code frame group has been DSV scrambled can be included in one of such symbol blocks, for example the symbol block n in FIG. 8b. After cross-interleaving, this symbol block of data bits is contained in the channel bits which are protected against erroneous read-out by the error-correction process utilized during reading. Another possibility would be to include the identifying information in the sub-code of the sub-code frame group. However, this will not be described in detail.

Figure 9:
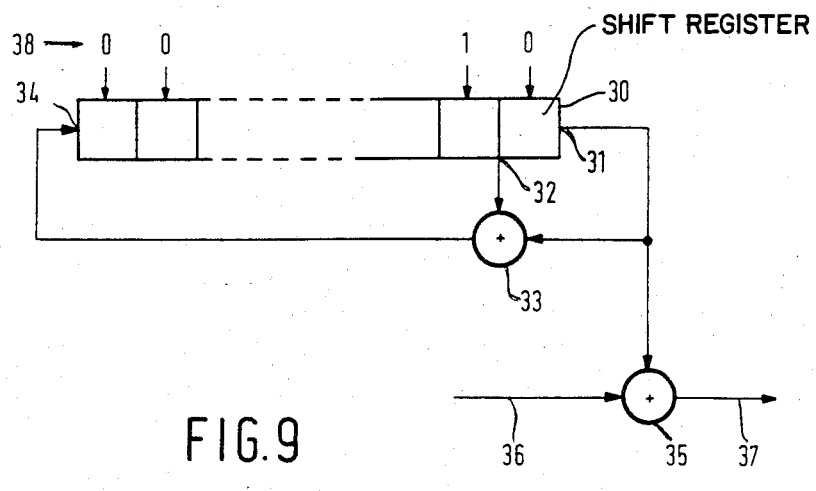
FIG. 9 is a circuit drawing of a non-self-synchronizing scrambler which may be employed for selective DSV correction in the apparatus in FIG. 1.

FIG. 9 shows an example of a non-self-synchronizing DSV scrambler which may serve as scrambler 10 in FIG. 1. It comprises a shift register 30 with a length of, for example, 15 bits. The output 31 of the shift register and the output 32 of the penultimate position therein are coupled to the two inputs of a modulo-2 adder 33. The output of the adder 33 is coupled to the input 34 of the shift register. The output 31 of the shift register 30 is also coupled to an input of a modulo-2 adder 35. The input stream of symbol blocks of data bits at connection point 9 in FIG. 1 is applied, in FIG. 9, to the other input of adder 35. The DSV scrambled data bit stream appears at the output of adder 35 on line 37. When the recording process is started the shift register is loaded with a starting value of, for example, all logic "zeros" except for the penultimate position which is a logic "one". Assuming that as the first symbol block of eight data bits the value 01111001 is supplied over line 36 during the first eight data bit clock pulses (the most significant bit first), the value 01000000 is added to the first-mentioned value in modulo-2 adder 35, so that the result 10111001 appears on line 37. It is to be noted that at each clock pulse two bits of the two values will be added to each other in modulo-2 adder 35.

It will be evident that other versions of a non-self-synchronizing DSV scrambler are possible. For example, a different starting value may be selected or outputs of other positions in shift register 30 may be coupled to the inputs of adder 33. Nor is a modulo-2 adder the only type of circuit for producing the DSV corrective scrambling. However, such a circuit has the advantage that the same kind of circuit can be employed for descrambling during read-out. The starting value of the shift register in the DSV descrambler at the beginning of the read-out must then be the same as the starting value of the DSV scrambler during recording. This may be achieved by recording the starting value as information in the record carrier, so that upon read-out this starting value can be read and loaded into the shift register of the descrambler. Also, instead of non-self-synchronizing scramblers/descramblers it is possible to employ self-synchronizing scramblers/descramblers.

Figure 2:
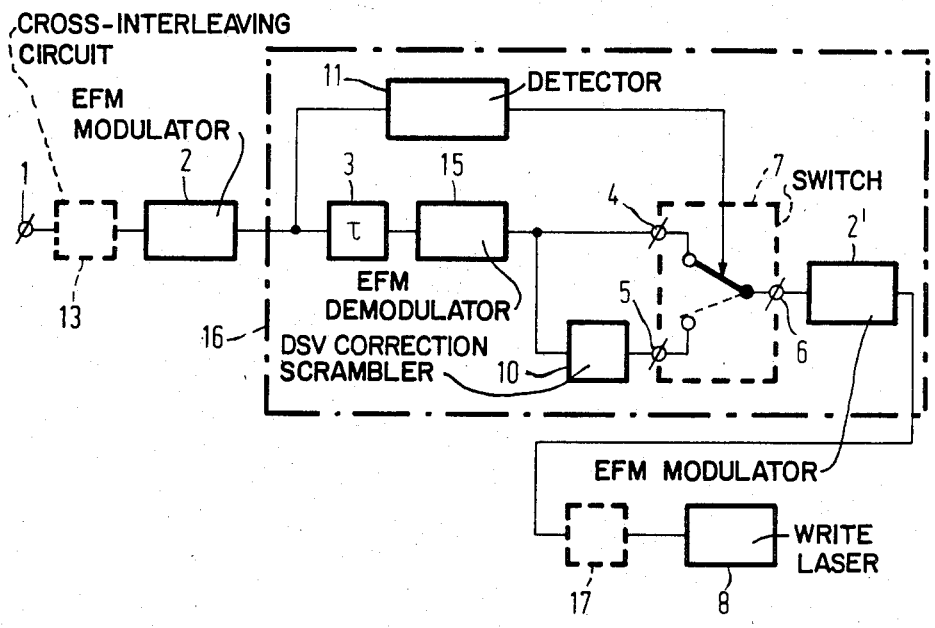
FIG. 2 shows a second embodiment of apparatus in accordance with the invention for recording information in an optical digital disc record carrier.

A second example of apparatus for recording information in an optical digital disc record carrier in accordance with the invention is shown in FIG. 2. The output of an encoder such as an EFM demodulator 2 is coupled to an input of a decoder such as an EFM demodulator 15 by a delay line 3 which provides a delay τ for decoding the symbol blocks of channel bits produced by modulator 2 back into the symbol blocks of data bits corresponding thereto. The output of demodulator 15 is coupled to input terminal 4 of switching means 7, and also by a DSV correction descrambler 10 to the other input terminal 5 of switching means 7. The output terminal 6 of switching means 7 is coupled to another EFM modulator 2' which is connected to write laser means 8.

For cross-interleaving the symbol blocks of data bits, a cross-interleaving circuit 13 may be arranged in the connection between input terminal 1 and the input of EFM modulator 2. In FIG. 2 corrective DSV scrambling is effected after cross-interleaving. However, as in FIG. 1, the cross-interleaving circuit 13 could be dispensed with and cross-interleaving effected in EFM modulators 2 and 2' prior to encoding therein of the symbol blocks of data bits into symbol blocks of channel bits. The symbol blocks of data bits would then have to be de-interleaved by EFM demodulator 15 after the symbol blocks of channel bits have been decoded into symbol blocks of data bits.

The operation of the apparatus in FIG. 2 is identical to the operation of the apparatus in FIG. 1 and is as described above with reference to FIGS. 3 to 9. The apparatus of FIG. 2 has the advantage that it can be constructed easily from existing recording equipment used in the standard digital disc system. Such equipment is comprised in the blocks 13, 2 and 8. Thus the apparatus shown in FIG. 2 can be assembled simply by constructing the portion 16 thereof and correcting it between EFM modulator 2 and write laser means 8.

The apparatus shown in FIG. 2 can include a further circuit 17 between portion 16 thereof and write laser means 8. Circuit 17 is the same circuit as that in block 16, except that it does not include the DSV correction descrambler 10. Circuit 17 serves to correctively DSV scramble those parts of the channel bit stream which, after DSV corrective descrambling in unit 10 in block 16, are still found to have a DSV which does not comply with the predetermined criteria. It will be evident that the apparatus for reading the recorded information from the optical record carrier must then also comprise two DSV descramblers, and that in addition to information identifying parts of the recorded data stream which have been DSV scrambled, information identifying such parts which have been DSV correctively scrambled twice during recording must also be recorded.

Another method of recording is to determine in a first step all the instants at which the DSV of the channel bit stream does not meet the predetermined criteria, and to store such instants in a memory. Subsequently, in a second step, all such portions of the channel bit stream can be processed, the DSV scrambled symbol blocks of channel bits being substituted at those instants.

Figure 10:
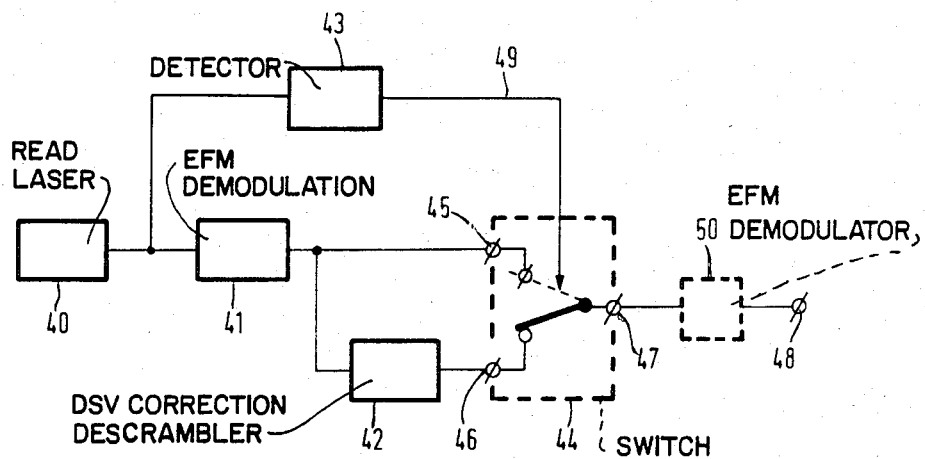
FIG. 10 is a circuit drawing of apparatus in accordance with the invention for reading information which has been recorded in an optical digital disc record carrier and parts of which had been subjected to corrective DSV scrambling during recording.

FIG. 10 shows an example of apparatus in accordance with the invention for reading from an optical digital disc record carrier the DSV correctively scrambled information. The apparatus comprises read laser means 40 for reading the symbol blocks of channel bits from the record track, a decoder such as an EFM demodulator 41 coupled to read laser 40 for decoding the symbol blocks of channel bits into corresponding blocks of data bits, a DSV correction descrambler 42 for descrambling the parts of the data bit stream inversely to the corrective DSV scrambling thereof which was effected during recording, detecting means 43 for identifying such parts of the data bit stream, and switching means 44. The output of the EFM modulator 41 is coupled to a first input terminal 45 of switching means 44. The output of descrambler 42 is coupled to a second input terminal 46 of switching means 44. The output terminal 47 of switching means 44 is coupled to an output terminal 48 of the apparatus. The switching means 44 serves to couple either its input terminal 45 or its input terminal 46 to its output terminal 47, depending on the control signal supplied by the detector 43 over a line 49.

When detector 43 identifies DSV correctively scrambled parts in the data stream read from the record carrier, such identifying information having been recorded in the data stream as explained above, it supplies a control signal which causes switching means 44 to assume the position shown; i.e., input terminal 46 switched to output terminal 47. When there are no such parts in the data stream, switching unit 47 connects its input terminal 46 to output terminal 47. In this way, during read-out the DSV scrambled parts of the data stream are descrambled in a manner which is the inverse of the DSV corrective scrambling effected during writing, so that the original symbol blocks of data bits are obtained at output terminal 48.

If during recording a self-synchronizing DSV corrective scrambler was used, a self-synchronizing descrambler must be used during read-out. Similarly, if during recording a non-self-synchronizing DSV corrective scrambler was employed, for example of the kind described above with reference to FIG. 9, the DSV demodulator 42 should also be a non-self-synchronizing descrambler such as the circuit of FIG. 9. As already indicated above, that circuit may be employed either as a scrambler or descrambler.

If during recording the information is first cross-interleaved in time, subsequently correctively DSV scrambled and then encoded into symbol blocks of channel bits, the reverse sequence must be employed during read-out. This means that in that case an EFM demodulator 50 for de-interleaving the cross-interleaved blocks of data bits would be required in the connection between output terminal 47 of switching means 44 and output terminal 48 of the read-out apparatus.

If during recording the information was first correctively DSV scrambled, subsequently cross-interleaved, and then encoded into symbol blocks of channel bits, for correct read-out it is necessary that EFM demodulator 41 be adapted to first decode the symbol blocks of channel bits into consecutive symbol blocks of data bits and, subsequently, to de-interleave the cross-interleaved blocks of data bits.

While the invention has been described with reference to certain specific embodiments thereof, it will be evident to those skilled in the art that various modifications and adaptations thereof may be made without departing from the true spirit and scope of the invention as defined in the ensuing claims.

What is claimed is:

1. In a method of recording and reading information in the form of a track of optically detectable pit and land areas in an optical record carrier, the information being a stream of successive symbol blocks of binary data bits which prior to being recorded are encoded into corresponding successive symbol blocks of channel bits comprising merging bits for minimizing the d.c. unbalance of successive symbol blocks of channel bits; and wherein during read-out of the recorded symbol blocks of channel bits they are decoded into the corresponding symbol blocks of data bits; the improvement characterized in that:

during recording those parts of the data bit stream which have a d.c. unbalance which does not comply with predetermined criteria the data bits of such parts are selectively scrambled prior to being encoded into corresponding parts of the channel bit stream, such scrambling serving to reduce the d.c. unbalance of such parts of the data bit stream; and during read-out of the recorded channel bit stream the parts of the decoded data bit stream corresponding thereto which were scrambled during recording are descrambled inversely to such scrambling to recover the original symbol blocks of data bits.

2. A method as claimed in claim 1 in which before the symbol blocks of data bits are encoded into corresponding symbol blocks of channel bits they are cross-interleaved in time; further characterized in that selective scrambling of the parts of the data bit stream which do not comply with said d.c. unbalance criteria is performed prior to cross-interleaving of such parts of the data bit stream.

3. A method as claimed in claim 2, in which after read-out of the symbol blocks of channel bits they are decoded into cross-interleaved symbol blocks of data bits which are thereafter de-interleaved; further characterized in that descrambling of the decoded data bit stream is performed after de-interleaving thereof.

4. A method as claimed in claim 1 in which before the symbol blocks of data bits are encoded into corresponding symbol blocks of channel bits they are cross-interleaved in time; further characterized in that selective scrambling of the parts of the data bit stream which do not comply with said d.c. unbalance criteria is performed after cross-interleaving thereof but prior to encoding such parts into corresponding symbol blocks of channel bits.

5. A method as claimed in claim 4, in which after read-out of the symbol blocks of channel bits they are decoded into cross-interleaved symbol blocks of data bits which are thereafter de-interleaved; further characterized in that descrambling of the decoded data bit stream is performed after such decoding but prior to such de-interleaving.

6. A method as claimed in claim 1, further characterized in that during encoding of the symbol blocks of data bits into corresponding symbol blocks of channel bits a determination is made of which parts of the resulting channel bit stream would not comply with said d.c. unbalance criteria; the parts of the data bit stream corresponding to such non-complying parts of the channel bit stream are selectively scrambled to derive symbol blocks of channel bits which comply with said criteria; the stream of scrambled data bits is encoded into a corresponding stream of channel bits; the non-complying parts of the channel bit stream are replaced by the encoded scrambled channel bit stream; and the resulting stream of channel bits is recorded in the record carrier.

7. A method as claimed in claim 6 in which the channel bit stream recorded in the record carrier is in the form of contiguous sub-code frame groups, each sub-code frame group comprising a plurality of frames, each frame comprising 1 control symbol block of data bits, 24 symbol blocks of channel bits, 8 symbol blocks of parity bits and 1 symbol block of synchronization bits; further characterized in that each of the selectively scrambled parts of the channel bit stream comprise a plurality of said frames.

8. A method as claimed in claim 7, further characterized in that each of the selectively scrambled parts of the channel bit stream comprise a plurality of sub-code frame groups.

9. A method as claimed in claim 8, further characterized in that information identifying each sub-code frame group which has been selectively scrambled is included in at least one of the symbol blocks of data bits in one of the first two frames of the relevant sub-code frame group.

10. A method as claimed in claim 7, further characterized in that information identifying each selectively scrambled frame is included in the control symbol block of data bits of the relevant frame.

11. In an apparatus for recording information in the form of a track of optically detectable pit and land areas in an optical record carrier, the information being a stream of successive symbol blocks of binary data bits which prior to being recorded are encoded into corresponding successive symbol blocks of channel bits comprising merging bits for minimizing the d.c. unbalance of successive symbol blocks of channel bits; such apparatus comprising an input terminal for receiving the successive symbol blocks of data bits, a first encoder coupled to such input terminal for encoding the symbol blocks of data bits into a stream of corresponding successive symbol blocks of channel bits, and an output terminal to which said stream of channel bits is supplied; the improvement characterized in that such apparatus further comprises:

detector circuit means coupled to said first encoder for producing a control signal when the d.c. unbalance value of any part of the stream of channel bits produced by said first encoder does not comply with predetermined criteria, such control signal continuing until a succeeding part of the stream of channel bits complies with such criteria;

circuit means coupled to said first encoder for selectively scrambling the data bits of the successive symbol blocks of data bits;

and switching circuit means selectively coupling said scrambling circuit means and said first encoder to said output terminal, said switching circuit means being further coupled to said detector circuit means and responsive to the control signal produced thereby to selectively supply parts of the stream of scrambled bits produced by said scrambling circuit means to said output terminal in place of those parts of the stream of unscrambled bits produced by said first encoder having a d.c. unbalance value which does not comply with said predetermined criteria; whereby the channel bit stream supplied to said output terminal has a d.c. unbalance value which complies with said predetermined criteria.

12. An improved recording apparatus in accordance with claim 11 further comprising a second encoder coupled to said scrambling circuit means for encoding the scrambled symbol blocks of data bits into a stream of corresponding scrambled symbol blocks of channel bits; said detector circuit means being coupled to said input terminal; and said switching circuit means selectively coupling said first and second encoders to said output terminal and being responsive to the control signal produced by said detector circuit means to selectively apply parts of the stream of scrambled channel bits produced by said second encoder to said output terminal in place of those parts of the channel bit stream produced by said first encoder which have a d.c. unbalance value which does not comply with said predetermined criteria.

13. An improved recording apparatus in accordance with claim 12, further characterized in that the first and second encoders are each adapted to cross-interleave the consecutive symbol blocks of data bits supplied thereto into new symbol blocks of data bits, and subsequently to encode the cross-interleaved symbol blocks of data bits into consecutive symbol blocks of cross-interleaved symbol blocks of channel bits.

14. An improved recording apparatus in accordance with claim 11, further comprising: a decoder coupled to said first encoder by a delay line, said decoder being adapted to decode the successive symbol blocks of channel bits produced by said first encoder into a stream of delayed successive symbol blocks of data bits corresponding thereto; the input of said scrambling circuit means being coupled to the output of said decoder for scrambling the data bits of the delayed successive symbol blocks produced by said decoder;

said switching circuit means having an output terminal to which it selectively couples said decoder and said scrambling circuit mean and being responsive to the control signal produced by said detector circuit means to selectively supply parts of the delayed stream of scrambled data bits produced by said scrambling circuit means to such output terminal in place of those parts of the delayed stream of data bits produced by said decoder corresponding to a channel bit stream having a d.c. unbalance value which does not comply with said predetermined criteria;

and a second encoder coupling the output terminal of said switching circuit means to the output terminal of said apparatus, said second encoder being adapted to encode the stream of data bits supplied to the output terminal of said switching circuit means into a stream of channel bits corresponding thereto at the output terminal of said apparatus.

15. An improved recording apparatus as claimed in claim 14, further characterized in that the first and second encoders are each adapted to cross-interleave the consecutive symbol blocks of data bits supplied thereto and to thereafter encode the cross-interleaved symbol blocks of data bits into consecutive symbol blocks of channel bits; and said decoder is further adapted to de-interleave the cross-interleaved symbol blocks of data bits produced thereby corresponding to the symbol blocks of channel bits supplied thereto by said first encoder.

16. An improved recording apparatus in accordance with claim 11, further characterized in that said scrambling circuit means is a self-synchronizing modulator.

17. An improved recording apparatus as claimed in claim 11, further characterized in that said scrambling circuit means is a non-self-synchronizing modulator.

18. An improved recording apparatus in accordance with claim 11, further characterized in that a cross-interleaving circuit is arranged in the connection between said input terminal and said first encoder for cross-interleaving the successive symbol blocks of data bits in time.

19. In an apparatus for reading information which has been recorded in the form of a track of optically detectable pit and land areas in an optical record carrier, the information being a stream of successive symbol blocks of binary data bits which prior to being recorded are encoded into corresponding successive symbol blocks of channel bits comprising merging bits for minimizing the d.c. unbalance of successive symbol blocks of channel bits, parts of the recorded stream of channel bits having been selectively scrambled prior to recording and such parts including information identifying them as having been selectively scrambled; such apparatus comprising means for reading the symbol blocks of channel bits from the record carrier, a first decoder coupled to said read means for decoding the stream of symbol blocks of channel bits into a stream of symbol blocks of data bits corresponding thereto, and an output terminal to which the stream of symbol blocks of data bits is supplied; the improvement characterized in that such apparatus further comprises:

a detector circuit connected to said read means and responsive to the recorded information identifying selectively scrambled parts of the stream of channel bits to produce a control signal in response to such information;

circuit means coupled to said first decoder for selectively descrambling the data bits of the stream of successive symbol blocks of data bits produced by said first decoder, such descrambling being the inverse of the scrambling to which the recorded stream of data bits were subjected during recording; and switching circuit means selectively coupling said descrambling circuit means and said detector circuit to said output terminal, said switching circuit means being further coupled to said detector circuit means and responsive to the control signal produced thereby to selectively supply parts of the stream of descrambled data bits produced by said descrambling circuit means to said output terminal in place of those parts of the stream of data bits produced by said first decoder which had been selectively scrambled prior to recording in the record carrier;

whereby the data bit stream supplied to said output terminal reproduces the data bit stream corresponding to the information recorded in the optical record carrier.

20. An improved reading apparatus in accordance with claim 19, further characterized in that said descrambling circuit means is a self-synchronizing demodulator.

21. An improved reading apparatus in accordance with claim 19, further characterized in that said descrambling circuit means is a non-self-synchronizing demodulator.

22. An improved reading apparatus in accordance with claim 19, wherein during recording the successive symbol blocks of data bits are interleaved prior to being encoded into symbol blocks of channel bits; further characterized in that said first decoder is adapted to decode the symbol blocks of channel bits into consecutive symbol blocks of data bits and thereafter to de-interleave the decoded symbol blocks of data bits.

23. An improved reading apparatus in accordance with claim 19, wherein during recording the successive symbol blocks of data bits are interleaved prior to being encoded into symbol blocks of channel bits; further characterized in that a second decoder for de-interleaving the cross-interleaved symbol blocks of data bits is arranged in the connection between the output terminal of said switching circuit means and said output terminal of the apparatus.

* * * * *